Feb. 19, 1946.    G. L. COTTER    2,395,170
VARIABLE LOAD BRAKE
Filed April 28, 1944
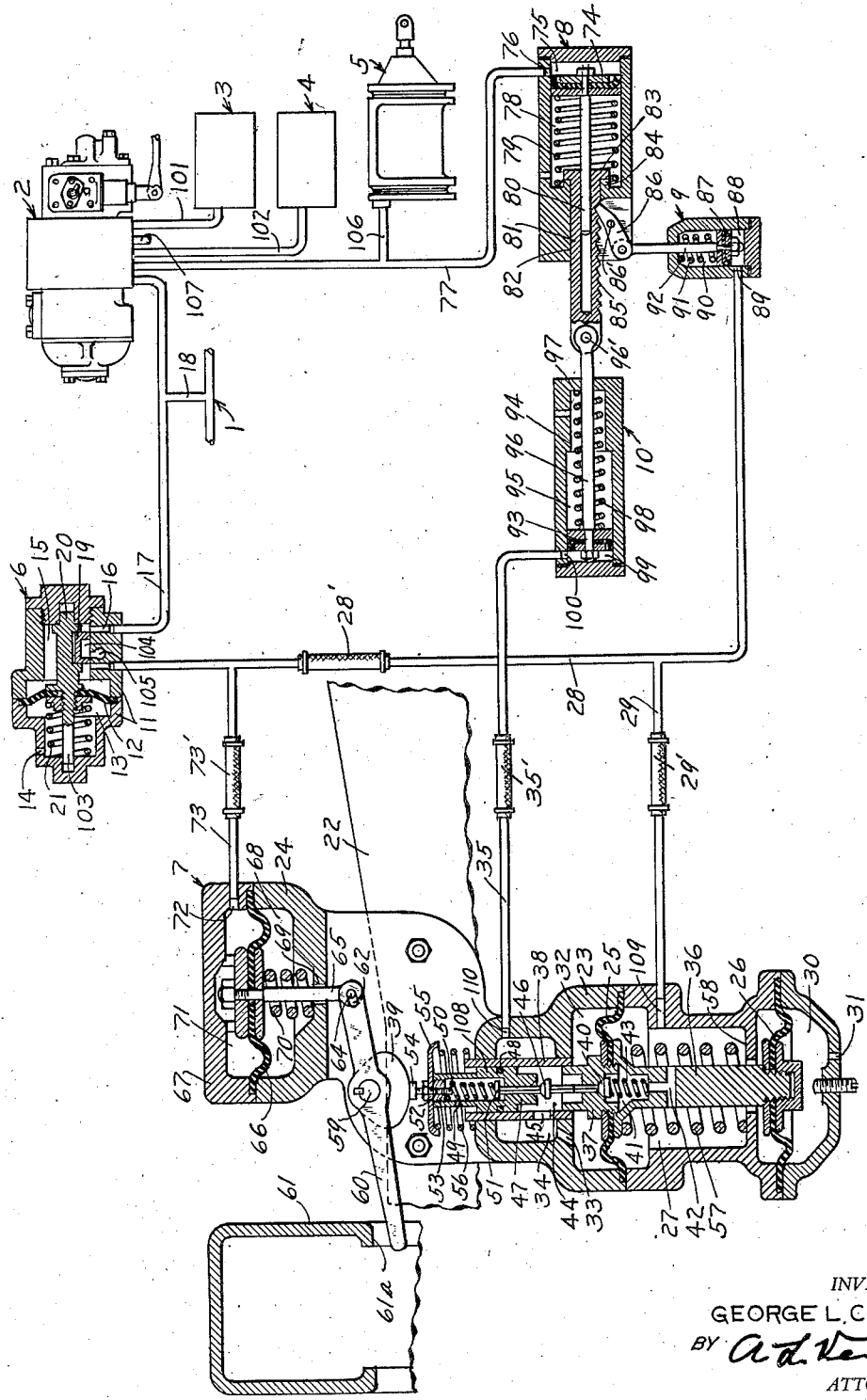
INVENTOR
GEORGE L. COTTER
BY
ATTORNEY Patented Feb. 19, 1946

2,395,170

UNITED STATES PATENT OFFICE 2,395,170

VARIABLE LOAD BRAKE

George L. Cotter, Winnetka, Ill., assignor to The Westinghouse Air Brake Company, Wilmerding, Pa., a corporation of Pennsylvania Application April 28, 1944, Serial No. 533,129

7 Claims. (Cl. 303—22)

This invention relates to variable load fluid pressure brakes, in which the braking power is automatically varied according to variations in the weight of the lading on the vehicle.

The principal object of the invention is to provide a novel variable load brake apparatus which is so constructed and arranged that, when the brake pipe pressure is being increased in charging, it will be automatically conditioned or changed over from empty braking to any degree of load braking called for by the weight of the load carried by the body of the vehicle, and which, when the brake pipe pressure exceeds a predetermined limit, will be maintained in its conditioned state so long as the brake pipe pressure is not reduced below said predetermined limit.

Another object of the invention is to provide a novel vehicle variable load brake mechanism which may be used in conjunction with a standard air brake equipment for the purpose of controlling the brake cylinder pressure in accordance with the brake pipe reduction and with various weights of loads carried by the vehicle.

Other objects and advantages will appear in the following detailed description of the invention.

The single figure in the accompanying drawing is a diagrammatic view, partly in section, of a variable load brake apparatus constructed in accordance with the invention.

DESCRIPTION

As shown in the drawing, the variable load fluid pressure brake equipment may comprise a brake pipe 1, a brake controlling valve device 2, an auxiliary reservoir 3, an emergency reservoir 4, a brake cylinder device 5, a change-over control valve device 6, a variable load valve mechanism 7, a variable volume reservoir 8, a latching mechanism 9, and a volume reservoir adjusting device 10.

The brake controlling valve device 2 shown is of the "AB" type but may be of any other desired type. This controlling valve device may be of substantially the same construction and have substantially the same operating characteristics as the "AB" valve device fully described in the patent to Clyde C. Farmer, No. 2,031,213, issued February 18, 1936, and in view of this it is deemed unnecessary to show and describe the device in detail. It will, of course, be understood that this mechanism operates upon a service reduction in brake pipe pressure to supply fluid under pressure from the auxiliary reservoir 3 to the brake cylinder device 5 to effect a service application of the brake, upon an emergency reduction in brake pipe pressure to supply fluid under pressure from both the auxiliary and emergency reservoirs 3 and 4, respectively, to the brake cylinder device 5 to effect an emergency application of the brakes, and upon an increase in brake pipe pressure to effect a release of the brakes and the charging of the brake equipment.

The change-over control valve device 6 may be mounted on the car body, and may comprise a two piece casing 11 having clamped therebetween a flexible diaphragm 12. At one side of this diaphragm there is a chamber 13 which is constantly connected through a passage 14 with the atmosphere. At the opposite side of the diaphram there is a valve chamber 15 which is constantly connected through a passage 16 and pipes 17 and 18 to the brake pipe 1.

Contained in the valve chamber 15 is a slide valve 19 which is adapted to be operated by a stem 20 which is operatively connected to the diaphragm in any suitable manner. Contained in chamber 13 is a spring 21 which at all times tends to urge the diaphragm 12, stem 20 and slide valve 19 toward the position in which they are shown in the drawing.

The variable load mechanism 7 comprises a structure having a casing which is rigidly secured by bolts and nuts or any other suitable means to a sprung part of the vehicle, such for instance, as the truck bolster 22 of a truck of the vehicle. As illustrated, the structure comprises a self-lapping valve portion 23 and weighing portion 24 operative, in accordance with the load carried by the vehicle, to control the self-lapping valve portion 23.

The self-lapping valve portion 23 comprises two spaced and axially aligned flexible diaphragms 25 and 26 which are rigidly clamped around their peripheries between two connected parts of the casing. Between these diaphragms is a chamber 27 which, as will hereinafter be described, may be supplied with fluid under pressure by the change-over control valve device 6 by way of pipes 28 and 29. Interposed in these pipes 28 and 29 are flexible conduits 28' and 29', respectively, which permit relative movement between the spring and unsprung parts of the vehicle. At the lower side of the diaphragm 26 is a chamber 30 which is constantly open to the atmosphere through a passage 31 while at the upper side of the diaphragm 25 is a chamber 32 which is in constant communication through a port 33 with a chamber 34 formed in the top of the casing portion, chamber 34 being in constant communication with the device 10 by way of a pipe 35. Interposed in this pipe 35 also is a flexible conduit 35'.

A stem 36 in chamber 27 has one end clamped to the diaphragm 26 while the opposite end is clamped to the diaphragm 25, the means clamping said stem to diaphragm 25 embodying a guide element 37 which extends through chamber 32 and which is slidably guided in the lower end of a bore in a sleeve 38 rigidly secured in the casing in axial alignment with the two diaphragms 25 and 26 and directly below a cam 39 of the weighing portion 24.

A poppet valve 40 is contained in a chamber 41 in the upper end of the stem 36, which chamber will at certain times, as will appear later, be supplied with fluid under pressure from chamber 27 by way of passages 42 in stem 36. Chamber 41 also contains a spring 43 which acts on the valve 40 for urging the same upwardly toward a seat provided on the adjacent end of the guide element 37.

The valve 40 has a fluted stem extending through a suitable bore in the guide element 37 into a chamber 44 provided in sleeve 38. The chamber 44 is constantly open through one or more ports 45 in sleeve 38, to the chamber 34 which encircles said sleeve. An exhaust valve 46 in chamber 44 engages the end of the fluted stem of valve 40 and in turn has a fluted stem mounted so as to slide in a bore in a plunger 47. The plunger 47 is mounted to slide in sleeve 38 and is provided with an annular recess in which is disposed a sealing ring 48 for preventing leakage of fluid under pressure from chamber 44 along said plunger and out of the upper open end of sleeve 38. The bore in plunger 47 is open above the sealing ring 48 to the atmosphere through one or more ports 49. This bore in the plunger contains a spring 50 which, acting through the medium of a spring seat 51 upon the stem of the exhaust valve 46, tends to urge this valve from its seated or closed position.

An adjusting screw 52 is screw-threaded into a plug portion 53 rigidly secured in the upper end of the plunger 47, said screw having a head 54 which engages the cam 39 of the weighing portion 24. A spring seat 55 is secured to the plunger 47 above the end of sleeve 38, and interposed between this seat and the casing is a bias spring 56 which exerts a force on the spring seat 55 which is just sufficient to urge the plunger 47 out of seating engagement with the exhaust valve 46 as shown in the drawing.

Contained in chamber 27 and interposed between the two flexible diaphragms 25 and 26 is a helical control spring 57 which encircles the stem 36 and has one end supported on an annular ledge 58 in the casing and having the opposite end seated on an annular spring seat formed on the upper end of the plunger 36 and thereby acts against the diaphragm 25 for urging same in the direction of the sleeve 38. This spring is adapted to be fully expanded with the parts in the position in which they are shown and to oppose all movement of the diaphragms in a downwardly direction from this position. The two diaphragms 25 and 26 are of equal areas so that the pressure of fluid in chamber 27 acting on the diaphragm 25 is opposed and balanced by said fluid pressure acting on the diaphragm 26. Thus, spring 56 provides the only force for opposing movement of the diaphragms in a downwardly direction, which movement will be produced when the cam 39 is rotated by the other parts of the weighing portion 24 now to be described.

The cam 39 is mounted on and keyed to a shaft 59 which is rotatably mounted in the casing of the variable load valve mechanism 7. For the purpose of rocking this shaft and thereby the cam 39 a lever 60 is secured intermediate its ends to the shaft. The left-hand end of the lever 60, as shown, is arranged to engage a surface 61a of a side frame 61 when said lever is rotated in a clockwise direction, which surface serves as a limiting stop for the lever. The right-hand end of the lever is provided with a slot 62 through which extends a pin 64 for operatively connecting the lever to a stem 65 which is arranged to actuate the lever, the slot providing for the necessary free relative movement between the lever and the stem when the lever is rocked.

The stem 65 is operatively connected in any suitable manner to a flexible diaphragm 66 which is clamped at its periphery between the casing and a cover 67. This stem extends through a chamber 68 at one side of the diaphragm 66 and through a bore 69 in the wall of said chamber and at its end is connected to the lever 60 in the manner previously described. Contained in the chamber 68 and encircling the stem 65 is a spring 70 which at all times tends to urge the diaphragm and stem toward the position in which they are shown.

At the opposite side of the diaphragm 66 is a chamber 71 which is in constantly open communication with the change-over control valve device 6 by way of passage 72 and pipes 73 and 28, the pipe 73 having interposed therein a flexible conduit 73'. The variable volume reservoir 8 comprises a casing having a bore in which a movable abutment or wall 74 is slidably mounted. At one side of this wall is a chamber 75 which is in open communication by way of a port 76 with a brake cylinder pipe 77 which leads from the brake controlling valve device 2 and brake cylinder device 5. As shown, the movable wall may be in the form of a piston having the usual packing which slidably engages the bore containing the piston.

This reservoir 8 serves as a dummy brake cylinder and its volume is varied by varying the position of the movable wall 74. As will later be described the positioning of the wall is determined by the operation of the valve mechanism.

At the left-hand side of the wall 74 is an atmospheric chamber 78 containing a helical spring 79 which engages the end wall of the chamber 78 and the non-pressure side of the piston 74 so as to constantly urge the piston toward the position in which it is shown. The piston 74 is provided with a guide stem 80 which is arranged to slide in the bore of a stop member 81. This stop member is likewise slidable in a bore 82 in the non-pressure end of the casing so that it may be moved into the chamber 78 toward the piston 74 to limit the travel thereof in a manner to be explained later. The inner end of the stop member 81 is provided with an annular stop lead or flange 83 which one one side engages an annular rib 84 formed in the wall of the chamber 78 about the bore 82 so as to prevent the stop member from leaving the bore. The rib 84 also serves as a centering retainer for one end of the spring 79.

The stop member 81 is further provided with ratchet teeth 85 which are adapted to be engaged by a pawl 86 to prevent movement of the stop member in an outwardly direction toward the position in which it is shown. The pawl 86 is pivotally mounted intermediate its ends of a pin 86' carried by the casing of the reservoir 8 and is operatively connected to the latching mechanism 9 which is operative to actuate the pawl into and out of locking engagement with any one of the teeth 85.

The latching mechanism 9 comprises a casing having a bore in which a piston 87 is slidably mounted. At one side of this piston is a chamber 88 which is in constant open communication with the change-over control valve device 6 by way of a port 89 and pipe 28.

At the opposite side of the piston 87 is a chamber 90 containing a helical spring 91 which encircles the stem 92 of the piston 87 and engages the inner end wall of the chamber 90 and the non-pressure side of the piston so as to constantly tend to urge the piston in a downward direction. The stem 92 extends through a bore in the casing of the mechanism 9 and is pivotally connected to the left hand end of the pawl 86.

The volume reservoir adjusting device 10 is for the purpose of positioning the stop 83 of the member 81 relative to the wall 74 and comprises a casing having formed therein a bore in which there is slidably mounted a piston 93, the travel of piston being limited by a stop shoulder 94 located in said bore. At the non-pressure side of the piston there is an atmospheric chamber 95. The piston is provided with a stem 96 which extends through chamber 95 and a guide bore in a wall 97 of the chamber and which at its end is operatively connected, by means of a pin 96' with the adjacent end of the stop member 81. Interposed between and operatively engaging piston 93 and wall 97 is a spring 98 which constantly tends to force the piston toward the position in which it is shown.

At the other side of the piston 93 there is a chamber 99 which is in open communication by way of port 100 and pipe 35 with the chamber 34 of the self-lapping valve device 23.

It will be understood that when the vehicle is empty, the truck bolster 22 which is spring supported in the usual manner will be in its normal or uppermost position with relation to the truck side frame 61, as shown, and that as the load carried by the truck bolster increases, the usual truck springs (not shown) will be compressed, so that the truck bolster will move downwardly relative to the truck side frame 61 and that this relative movement will always be proportional to the weight imposed on the truck bolster 22.

OPERATION

*Initial charging of the equipment*

Assuming the vehicle embodying the invention to be empty and separated from a train, the brakes on the vehicle to be released, the brake pipe 1 of the vehicle to be depleted of fluid under pressure, and the operating lever 60 of the weighing portion 24 of the variable load valve mechanism 7 to be temporarily disposed in the empty position in which it is shown, the brake controlling valve device 2 will be in a brake applied position and the several other parts of the equipment will be in the positions in which they are shown.

With the operating lever 60 and likewise the cam 39 in the empty position as shown, substantially no downward force is exerted by the cam on the head 54 of the screw 52. Spring 57 of the self-lapping valve device 23 will therefore be fully expanded, spring 56 will hold plunger 47 out of seating engagement with exhaust valve 46, and spring 41 will hold valve 40 in seating engagement with the guide element 37.

Now if the empty vehicle is placed in a train, the brake pipe 1 will of course be connected at each end of the vehicle to the corresponding brake pipe at the adjacent end of each adjacent vehicle in the train and as a result will be charged with fluid under pressure in the usual manner. Fluid under pressure thus supplied to the brake pipe 1 flows through a branch pipe 13 to the chambers at the faces of the service and emergency portions of the brake controlling valve device 2 moving them in due course to release and charging position. Fluid under pressure will then flow to the several chambers of the brake controlling valve device and thence, in the usual manner, to the auxiliary reservoir 3 by way of a pipe 101 and to the emergency reservoir 4 by way of a pipe 102.

Fluid under pressure also flows from the branch pipe 13 to the slide valve chamber 15 in the change-over control valve device 6 by way of pipe 17 and passage 16. The spring 21 will maintain the diaphragm in the position in which it is shown until, as presently described, a predetermined fluid pressure of approximately forty-five pounds per square inch has been built up in the valve chamber 15.

Fluid under pressure flows from chamber 15 by way of pipes 28 and 73 and passage 72 to chamber 71 in the weighing portion 24 of the variable load valve mechanism 7. A slight increase in the pressure of fluid in chamber 71 acting upon diaphragm 66 will overcome the opposing pressure of the spring 70 consequently the diaphragm will deflect downwardly, moving stem 65 downwardly and thereby rotating lever 60 and cam 39 in a clockwise direction until the left-hand end of the lever 60, as shown, strikes the surface 61a of the side frame 61. This rotation of the cam 39 will not, however, be sufficient to change the position of valves 40 and 46 with relation to their respective seating members. It should here be mentioned that the clearance space between the left hand end of the lever and the surface 61a of the truck frame is provided for the purpose of preventing the lever from engaging the surface when, due to service shocks, the truck bolster 8 moves vertically relative to the truck side frame.

Fluid under pressure will also flow from chamber 15 by way of pipes 28 and 29 and connected passages to chamber 27 in the self-lapping valve portion 23 of the variable load valve mechanism 7. Since diaphragms 25 and 26 are of the same area there will not of course be any diaphragm deflection in response to the pressure of fluid supplied to chamber 27. Valve 40 will therefore, remain seated.

Since, with the valve 40 seated, no fluid under pressure can flow to chamber 99 in the volume reservoir adjusting device 10, the several parts of this device will under these conditions remain in the positions in which they are shown.

Fluid under pressure will also flow from chamber 15 through pipe 28 and port 89 to chamber 88 of the latching mechanism 9. Now when the pressure of fluid in this chamber has been increased to approximately thirty-five (35) pounds, the fluid pressure will cause the piston 87 and stem 92 to move upwardly, thereby rotating the pawl 86 in a clockwise direction and out of locking engagement with the ratchet toothed portion of the stop member 81. But since the device 10 remains inactive the stop member 81 will remain in the position in which it is illustrated, that is to say remains in the proper position for braking an empty vehicle.

When the pressure of fluid in valve chamber 15 of the change-over control valve device 6 has been increased to approximately forty-five pounds per square inch, the diaphragm 12 will be caused to deflect in a direction toward the left-hand against the opposing pressure of spring 21. The diaphragm, as it thus deflects, acts through the medium of the stem 20 to shift the slide valve 19 in the same direction. When the deflection of the diaphragm 12 is brought to a stop by means of an extension 103, carried by the stem 20, engaging an interior surface of the casing, the slide valve 19 will have been moved into a position in which a cavity 104 therein connects the pipe 28 to an atmospheric passage 105.

With this communication established fluid under pressure in chamber 71 of the valve mechanism 7 is quickly vented to atmosphere by way of passage 72, pipes 73 and 28, cavity 104 in the slide valve 19 and atmospheric passage 105. Also, fluid under pressure in chamber 27 will be quickly vented to atmosphere by way of pipes 29 and 28 and control valve device 6. Since chamber 88 is connected to pipe 28 by way of port 89 fluid under pressure will be vented therefrom to atmosphere by way of the valve device 6. With the chambers 71, 27 and 88 thus vented of fluid under pressure, the diaphragm 66, lever 60 and lock controlling piston 87 which had been displaced will return to the positions in which they are shown, the change-over control valve device 6 being maintained by fluid at brake pipe pressure, in the position to which it was previously moved.

*Application of the brakes on an empty vehicle*

When it is desired to effect an application of the brakes, the brake pipe pressure is reduced in the usual manner, causing the brake controlling valve device 2 to function to supply fluid under pressure from the auxiliary reservoir 3 to the brake cylinder device 5 in order to advance the usual brake shoes, not shown, into frictional engagement with the vehicle wheels. The flow of fluid under pressure from the auxiliary reservoir to the brake cylinder device is by way of a pipe 101, through the brake controlling valve device 2 and brake cylinder pipes 77 and 106.

At the same time fluid under pressure flows through pipe 77 and port 76 to chamber 75 in the variable volume reservoir 8. The stop member 81 being in its retracted or empty car braking position, the wall 74 will move, under the influence of the pressure of fluid supplied to chamber 75, into its extreme left-hand position. It is obvious that by having this additional volume of the reservoir 8 added to the volume of the brake cylinder that the pressure of fluid acting in the brake cylinder device 5 to apply the brakes will be limited to that required for empty braking.

*Release of the brakes with the equipment conditioned for empty car operation*

When it is desired to effect the release of the brakes, the brake pipe pressure is increased in the usual manner, causing the brake controlling valve device 2 to function to establish communication from the brake cylinder device 2 to a pipe 107 which leads to atmosphere. Fluid under pressure now flows from the brake cylinder device 5 to the atmosphere by way of pipes 106 and 77, through the brake controlling valve device 2 and pipe 107. Fluid under pressure in the reservoir 8 also flows to the atmosphere by way of port 76 and pipe 77, through the device 2 and the atmospheric pipe 107. The brake cylinder device now responds to the release of fluid under pressure therefrom in the usual manner to effect a release of the vehicle brakes.

*Automatic change-over operation of the equipment on a partially loaded vehicle*

Assuming now that the brakes on the vehicle are released and that the vehicle is separated from a train and that while the brake pipe is depleted of fluid under pressure, lading is placed on the body of the vehicle. Under the influence of such additional weight the vehicle body, and consequently, the truck bolster 22 will move downwardly relative to the vehicle truck side frame 61 by reason of the usual truck springs, not shown, yielding to the additional weight. Since, as hereinbefore mentioned, the variable load valve mechanism 7 is carried by the bolster 22, it will be obvious that the vertical distance between the left-hand end of the operating lever 60 and the surface 61a of the side frame 61 will increase as the weight of lading increases, and as a result, the lever 60 can rotate in a clockwise direction correspondingly farther.

Now when the vehicle is connected in a train the brake pipe starts to charge with fluid under pressure in the same manner as hereinbefore described in connection with the charging of an empty vehicle. As before described fluid under pressure supplied to the brake pipe flows to chamber 15 in the change-over valve device 6, from whence it flows by way of pipe 28 and port 89 to chamber 88 in the latching mechanism 9. In response to this fluid pressure, piston 87 and stem 92 will move upwardly against the pressure of spring 91, thereby rotating pawl 86 in a clockwise direction and out of engagement with toothed portion of the stop member 81, which member will now be free to assume another position.

Fluid under pressure will also flow from pipe 28 through pipe 73 and passage 72 to chamber 71 in the weighing portion 24 of the variable load mechanism 7. In response to the pressure of fluid thus supplied to chamber 71, diaphragm 66 will deflect downwardly compressing spring 70 and, through the medium of stem 65 and pin 64, the operating lever 60 will be rotated in a clockwise direction. With the vertical distance between the lever 60 and the side frame 61 increased because of the added weight of the lading, lever 60 will now rotate into the partially loaded zone before stopping against the surface 61a of the side frame. Cam 39 being fixed to the shaft will be rotated thereby into a position in which it will become operative through the screw 52 to compress spring 56. This spring now acts to first move the plunger 47 downwardly into seating contact with the discharge valve 46 and to then move said valve along with said plunger to unseat the supply valve 40 against the opposing pressure of spring 43.

At the same time, fluid under pressure will flow from pipe 28 through pipe 29 and connected passage 109 to chamber 27 in the self-lapping valve device 23 of the variable load mechanism 7. With the valve 40 unseated, as just described, fluid under pressure will flow from chamber 27 located between the diaphragms, past valve 40 to chamber 44 within sleeve 38 and then through ports 45 into chamber 34. From chamber 34 fluid under pressure will flow through port 33 to chamber 32 and exert a downwardly directed force on diaphragm 25. In response to this force diaphragm 25 will deflect downwardly against the opposing force of spring 57 carrying with it diaphragm 26 and the guide element 37. When the guide element 37 has moved a distance equivalent to that which the valve 40 was depressed, the valve seat carried by the element will engage the valve 40, thereby interrupting the flow of fluid under pressure from chamber 27 to chamber 44.

It will thus be seen that the degree of pressure of fluid in chambers 44, 34 and 32 is dependent upon the degree of downward movement of the valve 40 and that this degree of movement is dependent upon the degree of rotation of the cam 39 in a clockwise direction. The degree of rotation of the cam is of course dependent upon the degree of rotation of the lever 60 permitted by the side frame 61.

From chamber 34 fluid under pressure will also flow by way of passage 110, pipe 35, and port 100 into chamber 99 of the volume reservoir adjusting device 10. The pressure of fluid in chamber 99 will cause the piston 93 to move to compress the spring 98 until such time as the opposing pressure of said spring is equivalent to the pressure of the fluid in the chamber, at which time the piston will come to a stop. As the piston 93 moves to the right in this operation, the stop member 81 will be moved in the same direction by the stem 96, the pawl 86 now being out of engagement with the toothed portion of the stop member 81.

When the brake pipe pressure is increased to the degree required to effect the operation of the change-over control valve device 6, this device will operate as described before to vent fluid under pressure from the chambers 88, 27 and 71. With the chamber 88 thus vented, the piston 87 and stem 92 of the latching mechanism 9 respond to the force of spring 91 to actuate the pawl 86 into engagement with the toothed portion of the stop member 81 to hold the stop member 81 in its newly assumed position.

With the chamber 71 of the weighing portion 24 of the variable load valve mechanism 7 vented, the spring 70 acts to return the diaphragm 66 and thereby the lever 61, shaft 59 and cam 39 to the position in which they are shown.

It should here be noted that the lever 60, when moved as just described, will be out of contact with the side frame 61. It is intended that this condition exist at all time except when the brake pipe 1 is charging with fluid under pressure and then only in a range of possibly from five to thirty-five pounds per square inch. This, as before mentioned, is desired so that the vibration and shocks developed in the side frame 61 during road service will not be imparted by way of the lever 60 to the variable load mechanism 7, thereby eliminating any possibility of damage thereto or undue wear thereof due to such vibration and shock.

With the chamber 22 of the self-lapping valve device 23 of the variable load valve mechanism 7 vented, the spring 56 now acts to move the plunger 47 upwardly thereof moving the exhaust valve seat out of engagement with the exhaust valve 46. Fluid under pressure in chamber 34 will now flow past the open valve 46, along the fluted stem of the valve, into a chamber 108 in the plunger 47 and thence to atmosphere by way of ports 49. Fluid under pressure will flow from chamber 32 by way of port 33 to chamber 34 and thence to atmosphere by way of the open exhaust valve. With the chamber 32 vented, diaphragms 25 and 26 will be moved upwardly by the action of spring 57 to a position wherein the stems of valves 40 and 46 again engage as illustrated, the valve 40 remaining seated during the upward movement of the diaphragm.

In the volume adjusting cylinder device 10 fluid under pressure will flow from chamber 99 through port 100, pipe 35, and passage 110 to chamber 34, and thence to atmosphere by way of the open exhaust valve. Piston 93 will not, however, return to the position in which it is held somewhere to the right thereof by the stop member 81 which is held in its newly assumed position by the latch mechanism 9.

With the stop member 81 positioned according to the pressure of fluid supplied to the volume reservoir adjusting device 10, the pressure having been increased in accordance with the load as determined by the variable load valve mechanism 7, the variable volume reservoir 8 is conditioned for braking a partially loaded vehicle.

*Application of the brakes on a partially loaded vehicle*

When an application of the brakes is made on a partially loaded vehicle by effecting a reduction in brake pipe pressure, the operation of the brake controlling valve device 2 will be identical with the operation described for an empty vehicle. From this it will be understood that fluid under pressure will be supplied to the brake cylinder device 5 and to chamber 75 in the variable volume reservoir 8.

As before, the wall 74 will move to the left until it is stopped by the member 81. Now, however, since the member 81 has been shifted to the right, the travel of the piston will be less than when the vehicle is empty and as a result the volume of chamber 75 is correspondingly reduced. Due to this reduction in the volume of chamber 75, the pressure of fluid in pipe 77, and brake cylinder device 5 will be correspondingly higher. Thus, a higher brake cylinder pressure is obtained for a given brake pipe reduction than is obtained for empty vehicle braking. It will readily be seen that as the load is increased the volume which equalizes with the brake cylinder device is reduced so that the pressure of fluid in the brake cylinder pipe 77 is correspondingly higher and likewise the braking forces.

Now when a full service application of the brakes is effected on the fully loaded vehicle, the brake controlling valve device 2 will operate in the usual manner to supply fluid under pressure from the auxiliary reservoir 3 to the brake cylinder device 5 and to the variable volume reservoir 8 until such pressures are equalized. With a fully loaded vehicle the volume of reservoir 8 will be the minimum attainable and consequently the equalization pressures will be the maximum attainable for a service application of the brakes.

In effecting an emergency application of the brakes on a fully loaded vehicle the emergency reservoir 4 is also connected to the brake cylinder device 5 and to the variable volume reservoir 8 so that a higher equalization pressure is obtained in the brake cylinder than is obtained in effecting a full service application of the brakes. It should here be mentioned that with the vehicle only partially loaded the equalization pressure and therefore the brake cylinder pressure will be less than that obtained when the vehicle is fully loaded.

When a subsequent release of the brakes is effected the brake controlling valve device 2 will function as hereinbefore described to release fluid under pressure from the brake cylinder device and the variable volume reservoir and thus effect a release of the brakes in the usual manner.

SUMMARY

The pressure of fluid in the brake cylinder device 5 for a given reduction of pressure of fluid in the brake pipe 1 is varied by varying the volume of chamber 75 in the variable volume reservoir 8 into which chamber fluid under pressure from the brake cylinder pipe 77 may expand, the reservoir being in effect a dummy brake cylinder. The variations in the volume of chamber 75 is controlled by the adjusting device 10 which is responsive to fluid under pressure from the variable load valve mechanism 7, the volume to be effective decreasing as the pressure of said fluid increases. The variable load valve mechanism 7 measures the vertical distance between a sprung portion and an unsprung portion of the vehicle truck and is operative to increase the pressure of fluid supplied to device 10 as the load, and consequently the distance increases.

When a brake application is effected on an empty vehicle, the variable load valve mechanism 8 will have previously been conditioned to permit use of the full volume of the reservoir 8. When a brake application is effected on a fully loaded vehicle, the variable load valve mechanism will have previously been conditioned to operate the device 10 to reduce the effective volume of the reservoir 8 to a minimum. When the vehicle is partially loaded the increase of the pressure of fluid supplied from the variable load valve mechanism 7 to the adjusting devices 10 will be increased as the load increases, thereby decreasing the volume of reservoir 8 which is effective to reduce the pressure of fluid in the brake cylinder device 5.

Having now described my invention, what I claim as new and desire to secure by Letters Patent, is:

1. In a vehicle fluid pressure brake equipment comprising a brake pipe, a brake cylinder, means for supplying fluid under pressure to said brake cylinder to effect an application of the brakes, reservoir means having a chamber which may expand in response to the pressure of said fluid, means operative in response to fluid under pressure to limit the expansibility of said chamber in an amount corresponding to the degree of fluid pressure acting thereon, and means operative to supply fluid from the brake pipe when the fluid pressure therein is below a certain degree to the last said means at a pressure corresponding to the weight of the load on the vehicle.

2. In a vehicle fluid pressure brake equipment comprising a brake cylinder, means for supplying fluid under pressure to said brake cylinder to effect an application of the brakes, a reservoir having connected to the fluid pressure side of said brake cylinder a chamber which has a variable capacity, movable abutment means operable in response to variations in fluid pressure therein to vary the capacity of said chamber, means adjustable in accordance with an increase in the load carried by the vehicle, and valve means conditionable by the adjustable means to supply fluid under pressure to said movable abutment means to decrease the capacity of said chamber as the fluid pressure in said movable abutment means is increased and thereby determine the pressure of fluid in said brake cylinder.

3. In a vehicle fluid pressure brake equipment comprising a force-exerting brake cylinder, a dummy brake cylinder, said dummy brake cylinder being of expansible volume, means responsive to increasing degrees of fluid pressure to limit the expansibility of said dummy brake cylinder, means for supplying fluid under pressure for effecting a brake application to both of said brake cylinder and said dummy brake cylinder, and fluid pressure responsive means controlled according to an increase in the weight of the load on the vehicle to supply fluid under pressure to said fluid pressure responsive means for decreasing the expansibility of said dummy brake cylinder.

4. In a vehicle fluid pressure brake equipment, a brake cylinder device, a volume reservoir which may expand in response to the pressure of fluid, a brake controlling valve device operative to supply fluid under pressure to said brake cylinder device and to said reservoir, fluid pressure responsive means for decreasing the expansibility of said reservoir as the fluid pressure acting upon said means increases, valve means operable to supply fluid under pressure to said fluid pressure responsive means, and means adjustable in accordance with the weight of the load carried by the vehicle and operative to cause said valve means to supply fluid to said fluid pressure responsive means at pressures increasing according to an increase in the weight of the load.

5. In a fluid presure brake equipment, a power brake cylinder device, a dummy brake cylinder device, said dummy brake cylinder device having therein an abutment movable in response to fluid under pressure, a brake controlling valve device operative to supply fluid under pressure to both of said brake cylinder devices, fluid pressure operated means for limiting the movement of said abutment in increasing degrees as the fluid pressure acting upon said means increases, valve means operable to supply fluid under pressure to said fluid pressure operated means, and means adjustable in accordance with the weight of the load carried by the vehicle and operative to cause said valve means to supply fluid to said fluid pressure operated means at pressures increasing according to increases in the weight of the load.

6. In combination, a brake cylinder device, a variable volume reservoir, a brake controlling valve device operative to supply fluid under pressure to said brake cylinder device and to said reservoir, fluid pressure responsive means for decreasing the volume of said reservoir as the fluid pressure acting thereupon increases, self-lapping valve means for controlling the flow of fluid under pressure to said fluid pressure responsive means, and means adjustable in accordance with the load carried by the vehicle, said self-lapping valve means being conditioned by said adjustable means for operation to limit the pressure of fluid acting upon said fluid pressure responsive means.

7. In a variable load brake apparatus for a vehicle truck having a relatively stationary part and having a part movable vertically relative to the stationary part as the load in the vehicle is increased, in combination, a brake cylinder device, a variable volume reservoir, brake control means for supplying fluid under pressure to said brake cylinder device and to said reservoir, valve means adjustable in accordance with the distance between the movable and the stationary parts of the vehicle, a fluid pressure operated mechanism carried by the movable part and comprising a lever rotatable into engagement with the stationary part for adjusting said valve means, a second fluid pressure operated mechanism for limiting the volume of said reservoir in accordance with the degree of relative movement between the movable and stationary parts of the vehicle to thereby directly determine the pressure of fluid in said brake cylinder device according to the load.

GEORGE L. COTTER.